United States Patent
Goel et al.

(10) Patent No.: US 12,481,758 B2
(45) Date of Patent: Nov. 25, 2025

(54) METHODS AND APPARATUS TO DISABLE SELECT PROCESSES FOR MALWARE PREVENTION

(71) Applicant: McAfee, LLC, San Jose, CA (US)

(72) Inventors: Ankit Goel, Uttar Pradesh (IN); Oliver Devane, Upton (GB); Vallabh Chole, Maharashtra (IN); Abhishek Karnik, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 233 days.

(21) Appl. No.: 17/956,471

(22) Filed: Sep. 29, 2022

(65) Prior Publication Data

US 2024/0111869 A1 Apr. 4, 2024

(51) Int. Cl.
G06F 21/56 (2013.01)
G06F 21/57 (2013.01)

(52) U.S. Cl.
CPC .......... G06F 21/566 (2013.01); G06F 21/577 (2013.01); G06F 2221/034 (2013.01)

(58) Field of Classification Search
CPC . G06F 21/566; G06F 21/577; G06F 2221/034
See application file for complete search history.

(56) References Cited

U.S. PATENT DOCUMENTS

| | | | |
|---|---|---|---|
| 7,797,421 B1 * | 9/2010 | Scofield | H04L 63/1416 709/224 |
| 9,147,073 B2 * | 9/2015 | Zaitsev | G06F 21/567 |
| 10,372,907 B2 * | 8/2019 | Antonov | G06F 21/554 |
| 10,581,889 B2 * | 3/2020 | Kovega | H04L 63/1425 |
| 10,789,361 B2 * | 9/2020 | Breiman | H04L 63/145 |
| 10,965,444 B2 * | 3/2021 | Weber | H04L 9/005 |
| 11,563,752 B2 * | 1/2023 | Marty | H04L 63/14 |
| 11,714,907 B2 * | 8/2023 | Edwards | G06N 20/00 726/23 |
| 11,849,000 B2 * | 12/2023 | Williams | H04L 67/535 |
| 11,874,920 B2 * | 1/2024 | Strogov | G06F 21/52 |
| 12,001,555 B1 * | 6/2024 | Edwards | G06F 21/566 |
| 12,197,575 B2 * | 1/2025 | Sims | G06F 21/566 |
| 2003/0098883 A1 * | 5/2003 | Pennell | G06F 16/9535 715/781 |
| 2014/0223566 A1 * | 8/2014 | Zaitsev | G06F 21/567 726/24 |
| 2014/0337979 A1 * | 11/2014 | Pereira | G06F 21/564 726/23 |

(Continued)

*Primary Examiner* — Sharon S Lynch
(74) *Attorney, Agent, or Firm* — Hanley, Flight & Zimmerman, LLC

(57) ABSTRACT

Methods, apparatus, systems, and articles of manufacture are disclosed to disable select processes for malware prevention, an apparatus comprising: at least one memory; instructions; and at least one processor to execute the instructions to cause the at least one processor to at least: identify execution of a computer process on a computing device; determine whether the identified computer process is in a list of computer processes to be monitored; in response to the identified computer process being listed in the list of computer processes to be monitored, determine an amount of time since last execution of the identified computer process; and suspend, in response to the amount of time since last execution meeting or exceeding a threshold time, execution of the identified computer process.

20 Claims, 9 Drawing Sheets

(56) References Cited

U.S. PATENT DOCUMENTS

| | | | |
|---|---|---|---|
| 2016/0156653 A1* | 6/2016 | Zhang | H04L 43/10 |
| | | | 726/23 |
| 2016/0352762 A1* | 12/2016 | Friedlander | H04L 63/1425 |
| 2017/0142144 A1* | 5/2017 | Weinberger | H04L 63/1408 |
| 2017/0206353 A1* | 7/2017 | Jai | G06F 21/565 |
| 2017/0351859 A1* | 12/2017 | Antonov | G06F 21/566 |
| 2018/0211038 A1* | 7/2018 | Breiman | G06F 11/1451 |
| 2021/0390182 A1* | 12/2021 | Boutnaru | G06F 21/52 |
| 2022/0100857 A1* | 3/2022 | Filar | G06N 5/01 |
| 2022/0141243 A1* | 5/2022 | Marty | G06F 21/566 |
| | | | 726/25 |
| 2022/0207139 A1* | 6/2022 | Strogov | G06F 21/54 |
| 2022/0292194 A1* | 9/2022 | Edwards | G06F 9/485 |
| 2023/0179612 A1* | 6/2023 | Inon | H04L 63/083 |
| | | | 726/23 |

\* cited by examiner

| PROCESS NAME | PROCESS ID | PATH(S) | TIMESTAMP OF LAST USE | BLOCK |
|---|---|---|---|---|
| Powershell | 7762A47 | C:\Windows\SysWOW64\WindowsPowerShell\v1.0\powershell.exe, C:\Windows\system32\windowspowershell\v1.0\powershell.exe | 1649220020 | NO |
| WScript | 7D92ED1 | C:\Windows\SysWOW64\wscript.exe | | YES |

FIG. 4

THE PROCESS _____ HAS BEEN SUSPENDED DUE TO SYSTEM SETTINGS DISABLING THIS PROCESS AFTER THE PROCESS HAS NOT BEEN USED FOR ___ DAYS. THIS PROCESS CAN BE USED MALICIOUSLY. ENABLE THIS PROCESS? :

YES      NO

FIG. 5

METHODS AND APPARATUS TO DISABLE SELECT PROCESSES FOR MALWARE PREVENTION

FIELD OF THE DISCLOSURE

This disclosure relates generally to malware prevention and, more particularly, to methods and apparatus to disable select processes for malware prevention.

BACKGROUND

In recent years, malware and other threats to computing devices have evolved. An increased number of security threats and attacks have used legitimate software as a target to execute attacks and to hide sources of malicious activity on computers. Computer security entities may be interested in detecting and mitigating new threats to improve security. Detecting and mitigating malware can prevent negative consequences including system compromise, loss of resources, etc. for a computer security entity and/or their clients. In some examples, a computer security entity may create solutions to be implemented to mitigate new software threats.

BRIEF DESCRIPTION OF THE DRAWINGS

FIG. 4 is an example diagram representative of a database storing data regarding computer processes, paths, times of last execution, and a policy on whether to block select computer processes.

FIG. 5 is an example user interface illustrating a notification to be displayed when a computer process has been suspended due to the process not being used for a threshold number of days.

Figure 1:
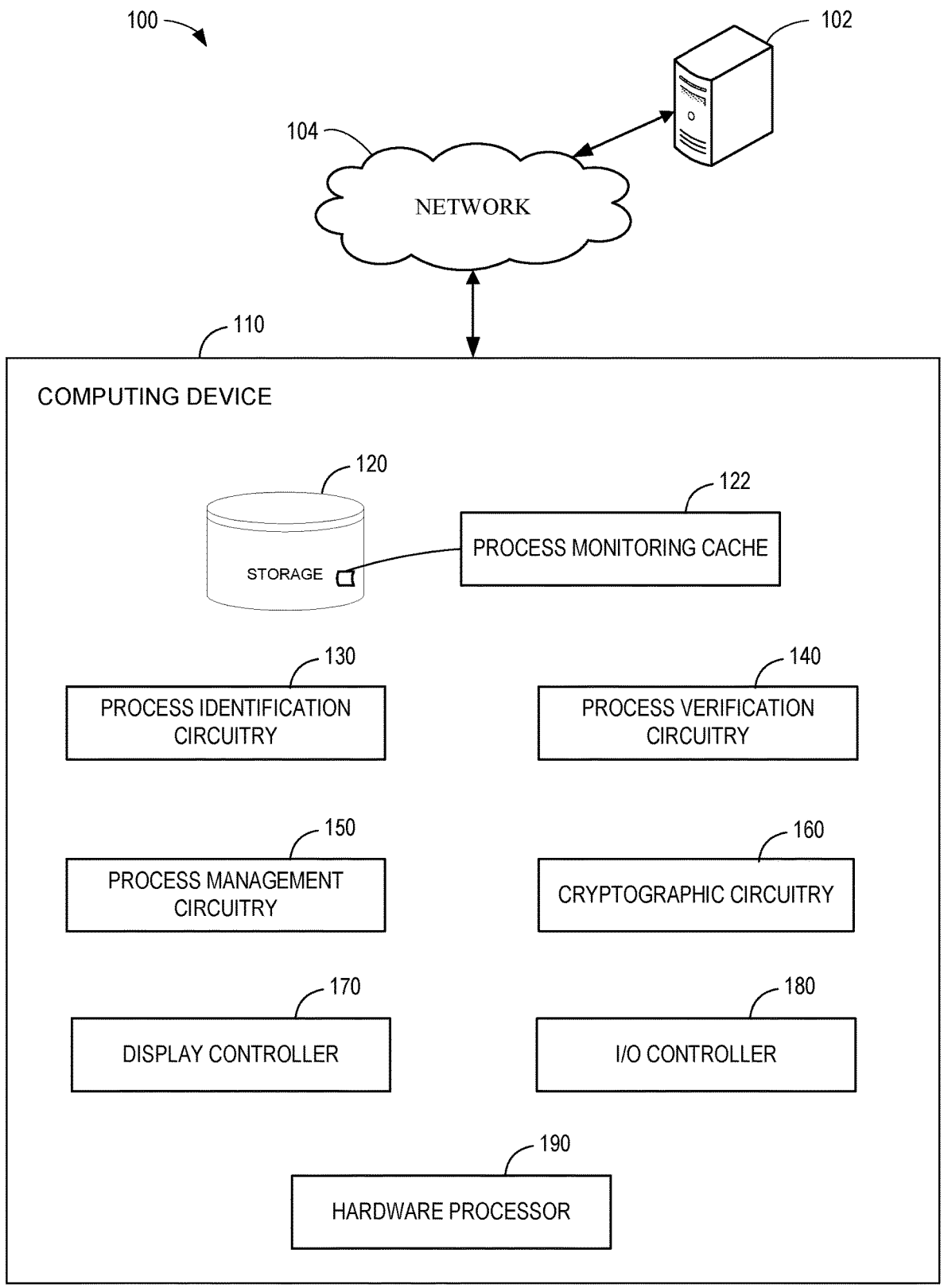
FIG. 1 is a block diagram of an example computing device connected with a cloud infrastructure in accordance with certain examples of the invention.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As new threats to computers continue to be discovered, and new approaches by attackers are revealed, it is of critical importance to find new solutions to prevent these new attacks and approaches. In recent years, an increased number of security threats and attacks have used legitimate software as an attack vector to execute these attacks and to hide the source of malicious activity on computers. These security threats and attacks may use, for example, non-malware binaries, including living off the land binaries (LOLBins), which are binaries that have a non-malicious nature, but can used by attackers to disguise malicious activities. These malicious activities can include executing malicious code on a client device, gaining access or other privileges to user data, gaining access to files, and more. For these reasons and others, legitimate software being used in computer attacks poses a serious threat to security and can result in system compromise.

These attacks can occur in a way which has been difficult to detect, especially when the attack vectors are still being used similarly to how they are legitimately used. Current malware prevention methods include several deficiencies when detecting non-malware binaries, including LOLBins and other legitimate software, being manipulated by attackers for malicious purposes. These deficiencies include failing to detect that the legitimate software may indicate signs of malicious use.

Many users of computing devices do not have a comprehensive understanding of which computer processes are accomplishing what purpose on a computing device. Even if a user of a computing device does possess a high level of computing literacy, common obfuscation techniques have made it difficult to realize which computer processes may be being used for malicious purposes. Therefore, the need arises for computer security entities to identify and prevent suspicious or rarely used computer processes from harming a user device by configuring which computer processes should be allowed or blocked on a device. For this reason and others, computer security entities are interested in developing solutions and finding methods to detect and mitigate malware being directed through seemingly legitimate computer processes to prevent computing system threats.

FIG. 1 is an example environment 100 including an example computing device 110 implemented in accordance with the teachings of this disclosure to disable select processes for malware prevention. In the example environment 100, an example server 102 communicates with an example network 104 which communicates with an example computing device 110. In the illustrated example, the example computing device 110 includes storage 120, including, in some examples, a process monitoring cache 122. The example computing device 110 further includes example process identification circuitry 130, example process verification circuitry 140, example process management circuitry 150, example cryptographic circuitry 160, an example display controller 170, an example I/O controller 180, and an example hardware processor 190.

The example server 102 represents any number of servers, including multiple and/or interconnected servers, with the capability of storing computer data. The example server 102 may be, in some examples, monitored, maintained, or operated in part or in full by an example computer security entity responsible for implementing computer security solutions on computing devices, including, for example, solutions to disable select computer processes for malware prevention.

The example network 104 represents interconnected computers and/or devices that, in some examples, share resources and use common network protocols. The example network 104 may be, in some examples, monitored, maintained, or operated by an example computer security entity.

In some examples, the example computing device 110 may communicate via the network 104. The example network 104 may include any of a private network, public network, VPN, etc.

The example storage 120 of the example computing device 110 of FIG. 1 is implemented by any memory, storage device, and/or storage disk for storing data such as flash memory, magnetic media, optical media, etc. Furthermore, the data stored in the example storage 120 can be in any data format such as binary data, comma delimited data, tab delimited data, structured query language (SQL) structures, etc. While in the illustrated example the example storage 120 is illustrated as a single element, the example storage 120 and/or any other data storage elements described herein may be implemented by any number and/or type(s) of memories. In the illustrated example computing device 110 of FIG. 1, the example storage 120 can store any type of data for use by the example computing device 110 including, for example, data files, operating system files, configuration files, executables, etc.

The example storage 120 may include an example process monitoring cache 122. In some examples, the example process monitoring cache 122 includes data, which may include a list of processes to be monitored. The list of processes may be sent to the example computing device 110 to be included in the example storage 120. In some examples, the list of processes to be monitored is communicated by a computer security entity via the example server 102. In some examples, the example process monitoring cache 122 is included in storage of the example server 102 and sent, replaced, updated, etc. by a computer security entity via the example network 104 and example computing device 110. In some examples, the example computing device 110 executes instructions to modify, edit, replace, etc. the contents of the example process monitoring cache 122. In some examples, these instructions are sent via a computer security entity. In some examples, this may be in response to execution of a new process on the example computing device 110. The example process monitoring cache 122 may be implemented as a database such as, for example, a process database, or any database containing data and information about a list of computer processes to be monitored on the example computing device 110 in accordance with certain examples of this invention.

The data included in the example process monitoring cache 122 may be created by a computer security entity, and in some examples the example computer security entity pushes data to the example process monitoring cache 122 stored at the example computing device 110. The example process monitoring cache 122 may, for example, contain a list of computer processes to be monitored in accordance with certain examples of this invention and in accordance with the example machine readable instructions 200 of FIG. 2. The example process monitoring cache 122 may be updated by the example computing device 110 upon monitoring of a new computer process or new information received from the example network 104 including information about a new computer process to be monitored and included in the example process monitoring cache 122.

The example process identification circuitry 130 identifies an example computer process on the example computing device 110. For example, the process identification circuitry 130 monitors executables on the example computing device 110 and may, in some examples, monitor resource usage and power required of the example computer process.

In some examples, the computing device 110 includes means for identifying. For example, the means for identifying a computer process may be implemented by the example process identification circuitry 130. In some examples, the process identification circuitry 130 may be instantiated by processor circuitry such as the example processor circuitry 612 of FIG. 6. For instance, the process identification circuitry may be instantiated by the example microprocessor 700 of FIG. 7 executing machine executable instructions such as those implemented by at least block 230 of FIG. 2. In some examples, the process identification circuitry 130 may be instantiated by hardware logic circuitry, which may be implemented by an ASIC, XPU, or the FPGA circuitry 800 of FIG. 8 structured to perform operations corresponding to the machine readable instructions. Additionally or alternatively, the process identification circuitry 130 may be instantiated by any other combination of hardware, software, and/or firmware. For example, the process identification circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example process verification circuitry 140 may check if a running process on the example computing device 110 is identified in the example process monitoring cache 122 in the example storage 120. The example process verification circuitry 140 may be responsible for verifying the time of last use of a computer process, and/or if a computer process is allowed etc. as identified in the example process monitoring cache 122. The example process verification circuitry 140 may monitor the example process identification circuitry 130 to verify a computer process identified by the example process identification circuitry 130.

In some examples, the computing device 110 includes means for identifying. For example, the means for identifying a running process, verifying last use of a computer process and/or verifying if a computer process is allowed may be implemented by the example process verification circuitry 140. In some examples, the process verification circuitry 140 may be instantiated by processor circuitry such as the example processor circuitry 612 of FIG. 6. For instance, the process verification circuitry 140 may be instantiated by the example microprocessor 700 of FIG. 7 executing machine executable instructions such as those implemented by at least blocks 240, 250, and/or 260 of FIG. 2. In some examples, the process verification circuitry 140 may be instantiated by hardware logic circuitry, which may be implemented by an ASIC, XPU, or the FPGA circuitry 800 of FIG. 8 structured to perform operations corresponding to the machine readable instructions. Additionally or alternatively, the process verification circuitry 140 may be instantiated by any other combination of hardware, software, and/or firmware. For example, the process verification circuitry 140 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example process management circuitry 150 manages the privileges and executions of computer processes on the example computing device 110. The example process management circuitry 150 is responsible for suspending, blocking, resuming, and/or terminating processes, etc. The example process management circuitry 150 may, upon the example process identification circuitry 130 and/or example process verification circuitry 140 identifying a computer process being executed on the example computing device 110 that has not been last used within a threshold number of days or has been last launched not within a threshold number of days, etc., suspend the identified computer process. The example process management circuitry 150 may, in accordance with certain examples of this invention, terminate the computer process, or allow the computer process to continue execution.

In some examples, the computing device 110 includes means for managing. For example, the means for managing privileges and executions on the computing device 110 may be implemented by the example process management circuitry 150. In some examples, the process management circuitry 150 may be instantiated by processor circuitry such as the example processor circuitry 612 of FIG. 6. For instance, the process management circuitry 150 may be instantiated by the example microprocessor 700 of FIG. 7 executing machine executable instructions such as those implemented by at least blocks 262, 270, 280 and/or 290 of FIG. 2. In some examples, the process management circuitry 150 may be instantiated by hardware logic circuitry, which may be implemented by an ASIC, XPU, or the FPGA circuitry 800 of FIG. 8 structured to perform operations corresponding to the machine readable instructions. Additionally or alternatively, the process management circuitry 150 may be instantiated by any other combination of hardware, software, and/or firmware. For example, the process management circuitry 150 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example cryptographic circuitry 160 may be responsible for producing and/or processing a hash function in association with computer processes in accordance with certain examples of this invention. In some examples, the example cryptographic circuitry 160 may encrypt and/or decrypt a disk and/or storage components of the example computing device 110. In some examples, the example cryptographic circuitry 160 may be responsible for decryption of at least some of the storage 120 including encrypted portions comprising an operating system.

The example display controller 170 controls the output display of the example computing device 110. In some examples, the example display controller 170 causes presentation of a user interface on the output display of the example computing device 110 including a notification that a computer process has been suspended due to detection of a possible vulnerability. In some examples, this notification may include details about the computer process that has been suspended. In other examples, the example display controller 170 causes presentation of a user interface on the output display of the example computing device 110 in accordance with any relevant examples of this invention.

In some examples, the computing device 110 includes means for controlling. For example, the means for controlling the output display of the example computing device 110 may be implemented by the example display controller 170. In some examples, the display controller 170 may be instantiated by processor circuitry such as the example processor circuitry 612 of FIG. 6. For instance, the display controller 170 may be instantiated by the example microprocessor 700 of FIG. 7 executing machine executable instructions such as those implemented by at least blocks 264 and/or 268 of FIG. 2. In some examples, the display controller 170 may be instantiated by hardware logic circuitry, which may be implemented by an ASIC, XPU, or the FPGA circuitry 800 of FIG. 8 structured to perform operations corresponding to the machine readable instructions. Additionally or alternatively, the display controller 170 may be instantiated by any other combination of hardware, software, and/or firmware. For example, the display controller 170 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example I/O controller 180 controls the input and output to and from the example computing device 110. The example I/O controller 180 may control connected input and output devices to the example computing device 110. In some examples, the example I/O controller 180 may manage input devices to the example computing device 110 including, for example, an audio sensor, a microphone, a camera (still or video), a keyboard, a button, a mouse, a touchscreen, a trackpad, a trackball, isopoint, and/or a voice recognition system. In some examples, the example I/O controller 180 may manage output devices of the example computing device 110 including, for example, display devices (e.g., a light emitting diode (LED), an organic light emitting diode (OLED), a liquid crystal display, a cathode ray tube display (CRT), a touchscreen, a tactile output device, a printer and/or speakers).

The example hardware processor 190 executes example machine readable instructions in accordance with this invention. The example hardware processor 190 is hardware and can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)), etc.

Figure 2:
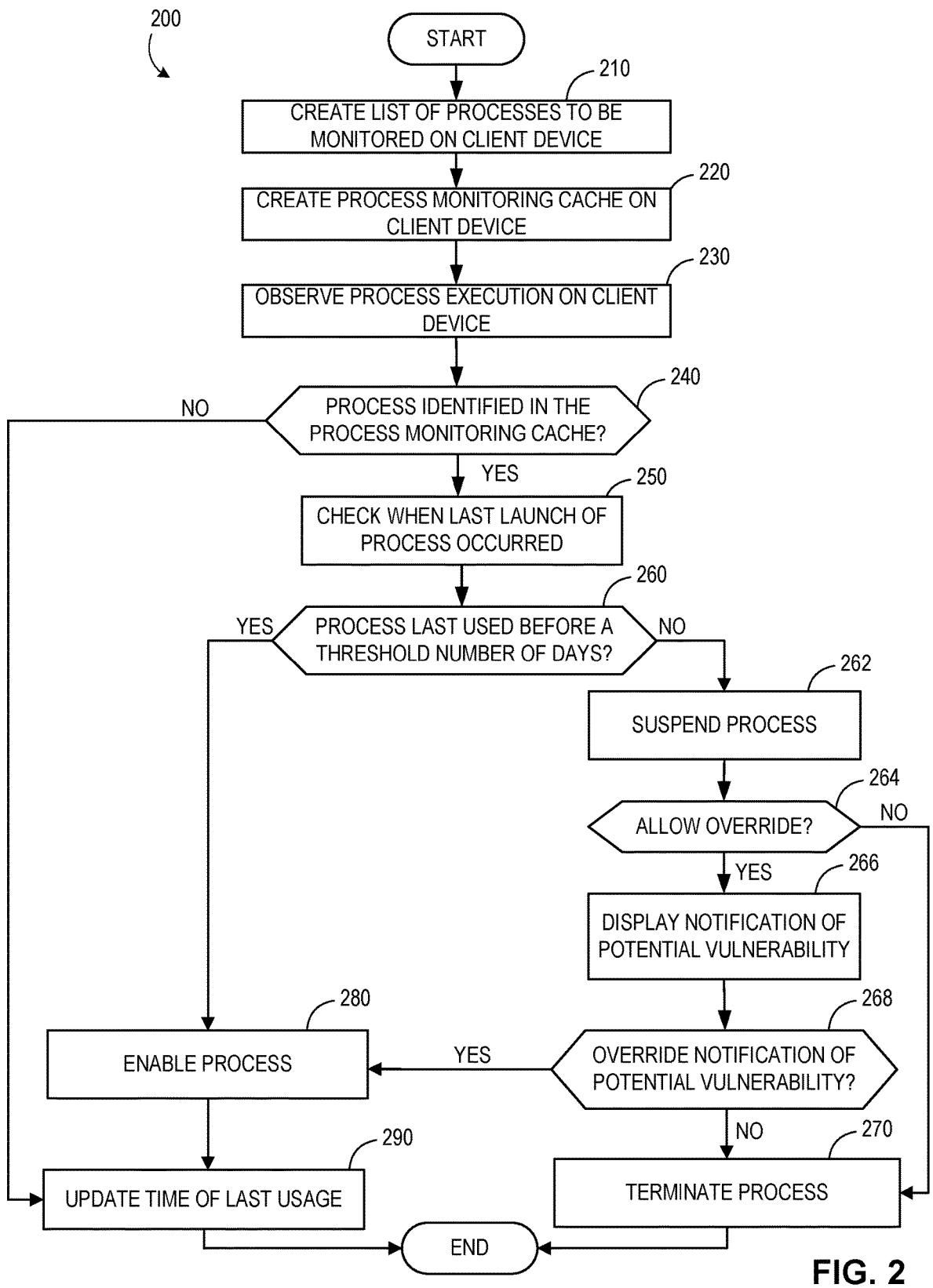
FIG. 2 is a flowchart representative of machine readable instructions which may be executed to implement the example computing device of FIG. 1 to disable select processes for malware prevention.

While an example manner of implementing the example computing device 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example process identification circuitry 130, the example process verification circuitry 140, the example process management circuitry 150, the example cryptographic circuitry 160, the example display controller 170, the example I/O controller 180 and/or the example hardware processor 190, and/or, more generally, the example computing device 110 of FIG. 1, may be implemented by hardware alone or by hardware in combination with software and/or firmware. Thus, for example, any of the example process identification circuitry 130, the example process verification circuitry 140, the example process management circuitry 150, the example cryptographic circuitry 160, the example display controller 170, the example I/O controller 180 and/or the example hardware processor 190, and/or, more generally, the example computing device 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing device 110 of FIG. 1 may include one or more elements, processes, and/or devices in addition to, or instead of, those illustrated in FIG. 2, and/or may include more than one of any or all of the illustrated elements, processes and devices.

A flowchart representative of example machine readable instructions, which may be executed to configure processor circuitry to implement the example computing device 110, is shown in FIG. 2. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 2, many other methods of implementing the example computing device 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 2 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions and/or example instructions 200 that may be executed and/or instantiated by processor circuitry to implement the example computing device 110 of FIG. 1 and/or to disable select processes for malware prevention. The machine readable instructions and/or the operations of FIG. 2 begin at block 210, at which a list of processes to be monitored on a client device is created. In some examples, the example computing device 110 is the client device. In some examples, a list of processes is created by a computer security entity and sent to the example computing device 110 from the example network 104. The list of processes to be monitored on a client device may be updated at any time or at certain intervals, including, for example, if the computer security entity has discovered a new process which is being used for malicious purposes. The list of processes to be monitored on a client device may contain any number of computer processes, for example, computer tools which are known to be exploited by attackers, including, for example, living off the land binaries, or, for example, computer tools which are used by a limited number of users and may be exploited by attackers in view of the example entity creating a list of processes to be monitored on a client device.

The list of processes may be stored in the example process monitoring cache 122 (FIG. 1) and/or, more generally, stored in the storage 120 (FIG. 1) of the example computing device 110 (FIG. 1). (Block 220). As used herein, the example process monitoring cache 122 may be any hardware or software component that stores data about the list of processes to be monitored on the example computing device 110.

In response to a list of processes to be monitored created on the example computing device 110, the example process identification circuitry 130 observes a process execution on the example computing device 110. (Block 230). The observation of a process execution may be completed by the example process identification circuitry 130 responsible at least in part for monitoring processes on the example computing device 110. In some examples, a task manager or other system monitor of the example computing device 110 may identify a process execution, and this information may be accessed by the example process identification circuitry 130 or other component of the example computing device 110 which identifies that a process is being executed on the example computing device 110. In some examples, the computing process being executed on the example computing device 110 may include example machine readable instructions processed by the example hardware processor 190.

In response to observing a process execution on the example computing device 110, the example process verification circuitry 140 evaluates whether the process is identified in the process monitoring cache 122. (Block 240). In some examples, the process is identified in the process monitoring cache 122 when at least one of a process name or a path of the process matches a corresponding process name or a path in the example process monitoring cache 122. In some examples, the example process verification circuitry 140 may evaluate whether a process is identified in the example process monitoring cache 122 by comparing a process name, process ID, process path, and/or other identifier to distinguish the computer process. In some examples, the example process name 302 (FIG. 3A) and/or process name 410 (FIG. 4) and/or process ID 420 (FIG. 4) and/or path 430 (FIG. 4) in FIGS. 3A and/or 4 representative of information stored by the example process monitoring cache 122 are used to evaluate if a process matches a process name and/or path in the example process monitoring cache 122 by the example process verification circuitry 140.

In response to the example computer process being identified in the example process monitoring cache 122 (e.g., block 240 returning a result of YES), the example process verification circuitry 140 checks when a last launch of the computer process occurred. (Block 250). In some examples this is represented by time/date of last use 440 in FIG. 4 representative of information stored by the example process monitoring cache 122. In some examples, the time of last launch is stored as a day, time, or other string identifier representing a time at which the computer process was last executed by the example computing device 110.

In response to identifying when a last execution of the example computer process occurred and obtaining a time of last execution of the example computer process, the process verification circuitry 140 evaluates if a process was last used before a threshold number of days. (Block 260). In some examples, the threshold number of days is a constant determined by a setting, policy, and/or configuration available on the example computing device 110. In some examples, this setting, policy, and/or configuration is determined by a computer security entity and may be sent to the example computing device 110 via the network 104. In some examples, the threshold number of days may be different for any number of the processes identified on the example process monitoring cache 122. In some examples, the threshold number of days may be determined at least in part due to some other reason, including, for example, if the computer process has been previously executed on the example computing device 110 or if it is a new process that has not been previously executed on the example computing device 110. In some examples, the process verification circuitry 140 compares a time/date of last use 440 (FIG. 4) representative of information stored by the example process monitoring cache 122 with a threshold number of days and returns a result (e.g., YES or NO) depending on if the threshold number of days is greater than or not greater than a time of last execution of the computer process.

In response to the example computer process not being last used before a threshold number of days (e.g., block 260 returning a result of NO), the process is suspended. (Block 262). In some examples, the example process management circuitry 150 is responsible for suspending the process. As used herein, suspension of a process includes halting of execution of the process such that execution of the process may be resumed at a later time. In some alternative examples, the process may be terminated entirely such that resumption of execution is not possible. In such a termination example, a command to execute the process might need to be re-entered to re-start execution of the process.

In response to suspending the example computer process (Block 262), a setting, policy, and/or configuration on the example computing device 110 may determine if an override is allowed (Block 264). In some examples, the setting, policy, and/or configuration on the example computing device 110 to determine if an override is allowed is determined by a computer security entity and sent to the example computing device 110 via a server 102 and/or an example network 104. In some examples, there may be a default setting to allow or not allow an override after detection of a potential vulnerability, and in some examples this default setting is configured by an example computer security entity.

In response to an override being allowed, a notification of potential vulnerability is displayed. (Block 266). In some examples, the example display controller 170 causes display of a notification of potential vulnerability. The notification of potential vulnerability includes a notification that a particular computer process has been suspended due to a potential vulnerability. In some examples, the notification of potential vulnerability includes the name or other identification of the suspended process and/or a number of days that have passed since the process was last executed on the example computing device 110.

In response to displaying the notification of potential vulnerability, the display controller 170 causes display of a notification allowing the option to override or not override the suspension of the computer process. (Block 268). In some examples, the display controller 170 displays options to allow or not allow a process to execute after a determination that the process may be used suspiciously or may be used for harmful purposes. In some examples, this notification can include the name of the process and/or the time and/or date of last use of the computer process and/or any information about why the computer process has been identified as suspicious.

In response to the notification of potential vulnerability not being overridden (e.g., block 268 returns a result of NO), the computer process is terminated. (Block 270). The process may be terminated upon a response of "NO", "DO NOT ALLOW", etc. to the displayed notification of potential vulnerability and the option to override the notification. In some configurations, the process will be terminated if no response is received within a particular timeframe or if no response is received to the notification of potential vulnerability.

Alternatively, in response to an override not being allowed (e.g., block 264 returns a result of NO), the process is terminated. (Block 270). In some examples, a notification of potential vulnerability may be displayed. In some examples, the notification may include only an option to terminate the process and/or an option to clear the notification. In some examples, the notification may include contact information of a computer security entity or other party responsible for providing assistance or for identifying the computer process and/or the function of the computer process identified as suspicious on the example computing device 110.

Alternatively, in response to the computer process last used before a threshold number of days (e.g., block 260 returns a result of YES), and/or the notification of potential vulnerability being overridden (e.g., block 268 returns a result of YES), the computer process is enabled. (Block 280). Enabling, or allowing the computer process allows the computer process to continue execution on the example computing device 110.

In response to the computer process being allowed at block 280, the time of last usage of the computer process is updated. (Block 290). In some examples, the date and/or time of last usage of the computer process is updated in the process monitoring cache 122.

Alternatively, in response to the computer process name not matching a name in the example process monitoring cache 122 (e.g., block 240 returns a result of NO), the time of last usage is updated. (Block 290). In some examples, the time of last usage may include a date, time, and/or timestamp associated with a particular moment in time representing the time of last usage of a computer program.

Figure 3A:
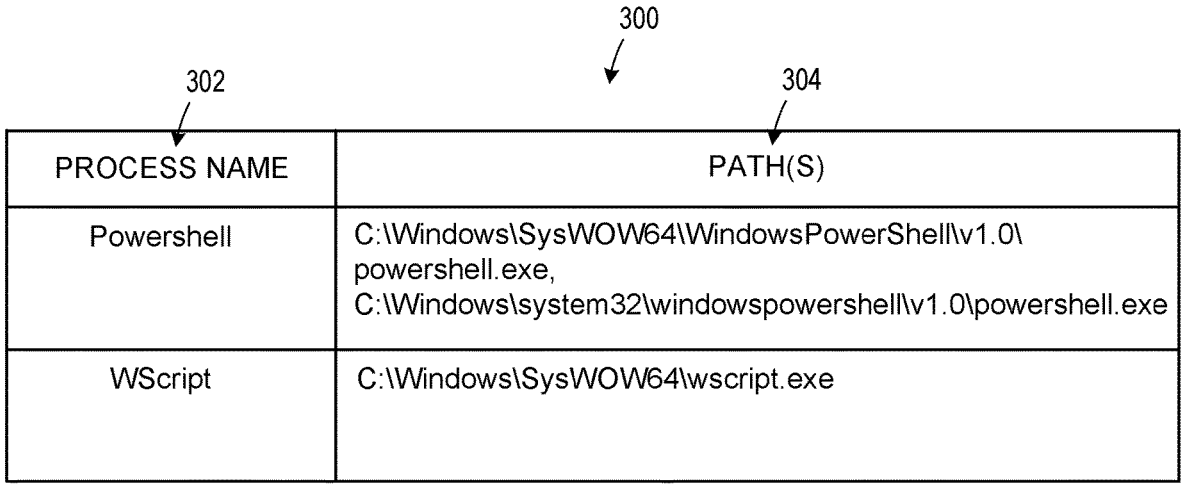
FIG. 3A is an example diagram representative of a database storing data regarding computer processes and their paths.

FIG. 3A is an example of a table 300 representing data stored in an example storage 120 of the example computing device 110. In some examples, this data is to represent a list of computer processes to be monitored by the process monitoring cache 122 of the example computing device 110 sent from an example computer security entity. The data stored by the example process monitoring cache 122 may include a process name column 302 and a file path(s) column 304 of an example computer process.

FIG. 3A includes an example process name column 302. In the example process name column 302, the names or identifiers of processes monitored on the example computing device 110 may be listed.

FIG. 3A includes an example path(s) column 304. In the example path(s) column 304, the location of the executable stored, for example, in the storage 120 of the example computing device 110 may be listed.

Example data of FIG. 3A includes several examples of example process names associated with example file path(s). This data may be present in the example process monitoring cache 122

Figure 3B:
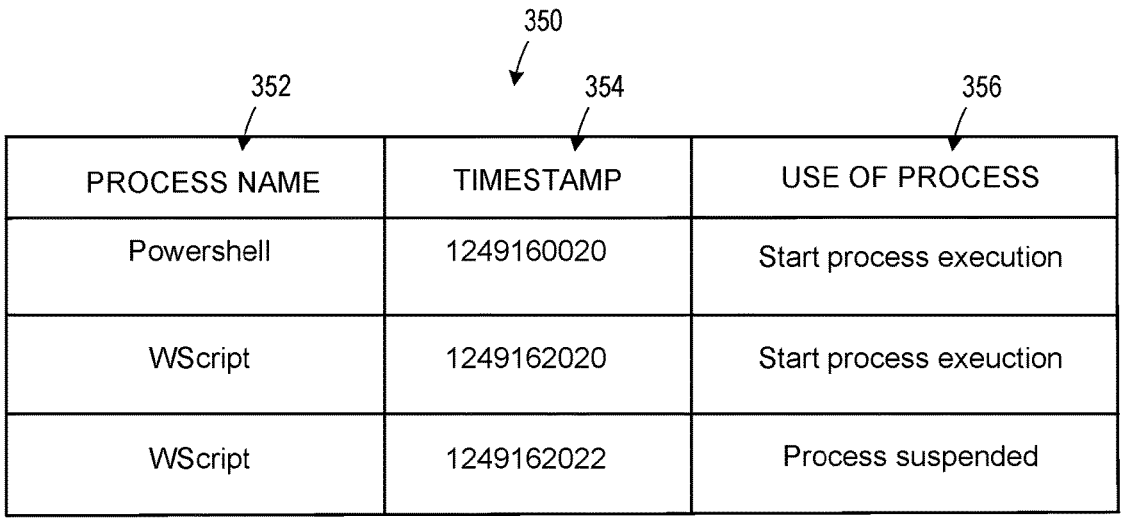
FIG. 3B is an example diagram representative of a database storing data regarding computer processes and their usage (e.g., startup and execution of a computer process).

FIG. 3B is an example of a table 350 representing data stored in an example storage 120 of the example computing device 110. In some examples, this data is to be stored by a task manager, system monitor, etc. responsible for monitoring a computer process on the example computing device 110. In some examples, the data including current time of computer process usage and the usage of the process (e.g., process is executed, process is suspended, process is terminated, etc.) is stored in the process monitoring cache 122 for use by the example process identification circuitry 130, the example process verification circuitry 140, and/or the process management circuitry 150, etc.

FIG. 3B includes an example process name column 352. In the example process name column 352, the names or identifiers of processes monitored on the example computing device 110 may be listed.

FIG. 3B includes an example timestamp column 354. In the example timestamp column 354, the timestamp may represent a current timestamp from a system clock, standard time, etc. representing a moment in time at which the process is monitored. The example timestamp column 354 may include timestamp data, for example, in the form of an integer, double, float, string, and/or any other data sufficient for storing data associated with events at a moment in time, including a timestamp.

FIG. 3B includes an example use of process column 356. In the example use of process column 356, an example use of process monitored by a task manager, system monitor, etc. may be included. In some examples, this may include starting process execution, suspending a process, terminating a process, etc. The data stored in the example use of process column 356 may include a string or any type of machine readable data. In some examples, the example data of FIG. 3B, or any data stored relating to a computer process on the example computing device 110, may be accessed by the process identification circuitry 130, process verification circuitry 140, and/or the process management circuitry 150 to complete any number of examples in accordance with this invention.

FIG. 4 is an example table 400 representing data stored in the example storage 120 of the example computing device 110. The example data listed in FIG. 4 may represent data stored in the example process monitoring cache 122.

The example FIG. 4 includes an example process name column 410. In the example process name column 410, the names or identifiers of processes monitored on the example computing device 110 may be listed.

FIG. 4 includes an example process ID column 420. The example process ID column 420 may include any process identifier in connection with an example computer process on the example computing device 110. The example process ID column 420 may also include a hash function in accordance with any process being executed on the example computing device 110. The hash function may be associated with a computer process being executed and may be generated by the example cryptographic circuitry 160 to generate the function and store the function on the example storage 120 of the example computing device 110. The example process ID column 420 may include string data and/or any data for storing identification associated with an example computer process.

FIG. 4 includes an example path(s) column 430. In the example path(s) column 430, the location of the executable stored, for example, in the storage 120 of the example computing device 110 may be listed.

FIG. 4 includes an example timestamp of last use column 440. In the example timestamp of last use column 440, the timestamp may represent a current timestamp from a system clock, standard time, etc. representing a moment in time at which the process is monitored. The example timestamp of last use column 440 may include timestamp data, for example, in the form of an integer, double, float, string, and/or any other data sufficient for storing data associated with events at a moment in time, including a timestamp. The example timestamp of last use column 440 may be updated at the identification of a process executing on the example computing device 110, for example, by the example process identification circuitry 130.

FIG. 4 includes an example block column 450. In some examples, the example block column 450 includes a "YES" or "NO" statement in accordance with whether the process is to be blocked from executing on the example computing device 110. In some examples, this may be due to the process not being used before a threshold number of days.

FIG. 5 is an example user interface 500 displaying a notification that a process has been suspended due to the process not being used for a threshold number of days. In some examples, the user interface 500 presents a message that the computer process can be used maliciously. In some examples, the user interface 500 may present an option for a user to enable or not enable the process. In some examples, the user interface 500 may only be displayed in the event of a setting, policy, and/or configuration, etc. on the example computing device 110, stored, for example, in the example storage 120 of the example computing device 110, allowing the enabling of a process after user interface 500 presents a message that the computer process can be used maliciously. In some examples, the example screen may present a message detailing the name, identification information, path, time of last use, and/or other information regarding last uses and patterns of the computer program in question.

Figure 6:
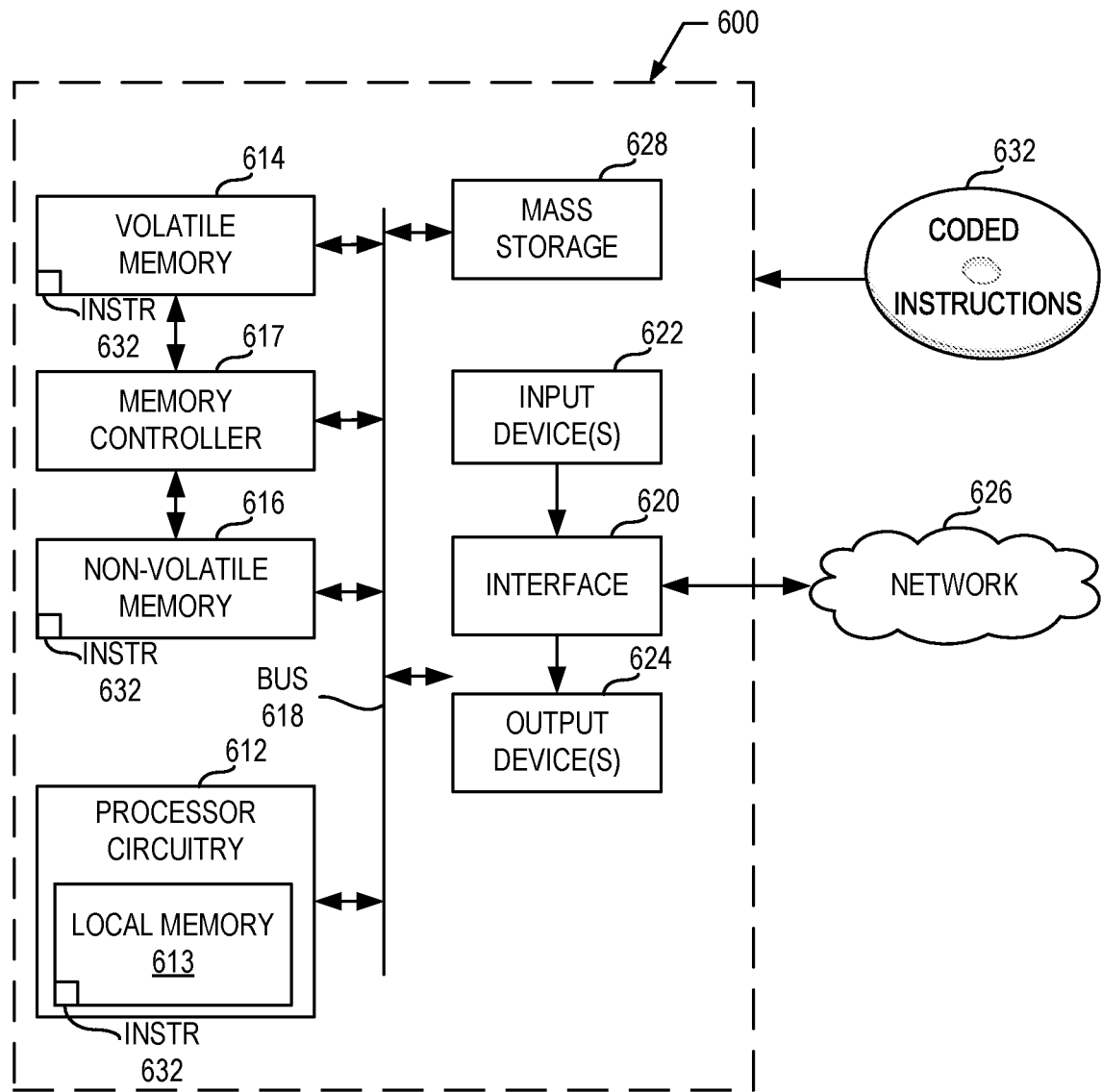
FIG. 6 is a block diagram of an example processing platform including processor circuitry structured to execute the example machine readable instructions of FIG. 2 to implement the example computing device of FIG. 1 to disable select processes for malware prevention.

FIG. 6 is a block diagram of an example processor platform 600 structured to execute and/or instantiate the machine readable instructions and/or the operations of FIG. 2 to implement the example computing device 110 of FIG. 1. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements example storage 120, an example process monitoring cache 122, example process identification circuitry 130, example process verification circuitry 140, example process management circuitry 150, example cryptographic circuitry 160, an example display controller 170, an example I/O controller 180, and an example hardware processor 190.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices

628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIG. 2, may be stored in the mass storage device 628, in the volatile memory 614, in the non-volatile memory 616, and/or on a removable non-transitory computer readable storage medium such as a CD or DVD.

Figure 7:
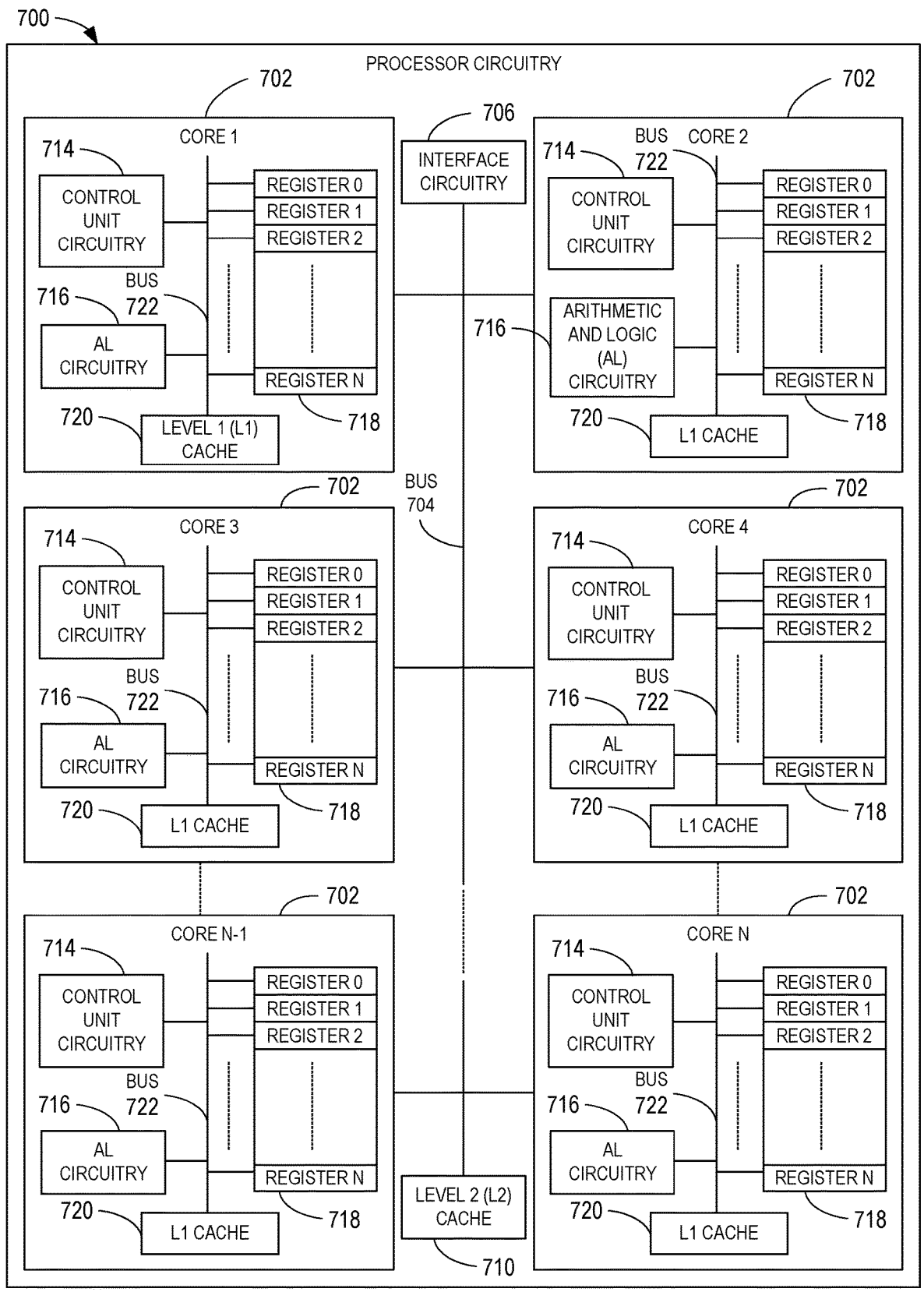
FIG. 7 is a block diagram of an example implementation of the processor circuitry of FIG. 6. Example processor circuitry is structured to execute the example computer readable instructions of FIG. 2 to implement the example computing device of FIG. 1.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowchart of FIG. 2 to effectively instantiate the circuitry of FIG. 1 as logic circuits to perform the operations corresponding to those machine readable instructions. In some such examples, the circuitry of FIG. 1 is instantiated by the hardware circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 2.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
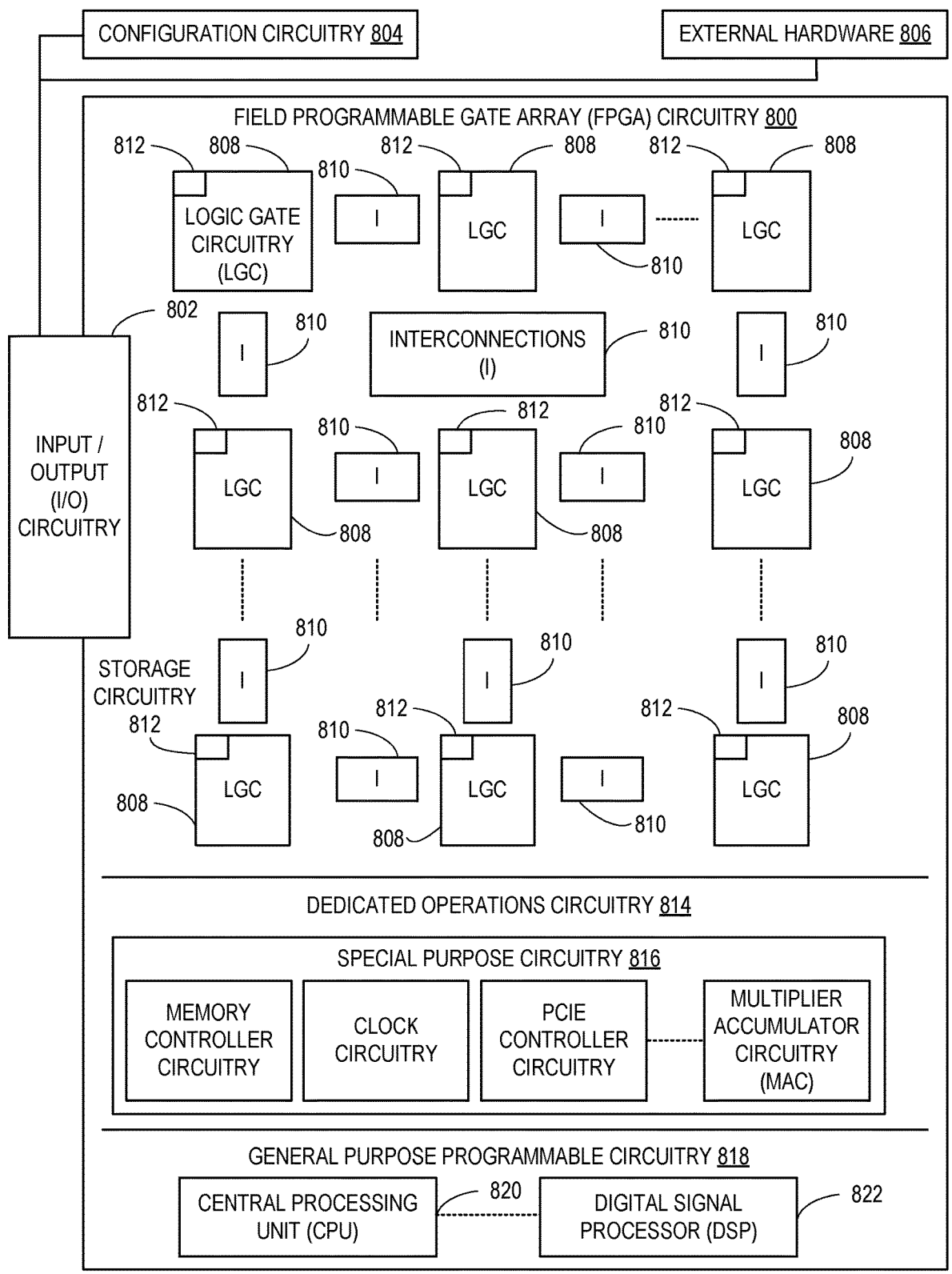
FIG. 8 is a block diagram of another example implementation of the processor circuitry of FIG. 6. In this example, example field programmable gate array (FPGA) circuitry is structured to execute the example computer readable instructions of FIG. 2 to implement the example computing device of FIG. 1.

FIG. 8 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 2 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 2. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 2. As such, the FPGA circuitry 800 may be structured to effectively instantiate some or all of the machine readable instructions of the flowchart of FIG. 2 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 2 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIG. 2 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 2 may be executed by one or more of the cores 702 of FIG. 7, a second portion of the machine readable instructions represented by the flowchart of FIG. 2 may be executed by the FPGA circuitry 800 of FIG. 8, and/or a third portion of the machine readable instructions represented by the flowchart of FIG. 2 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
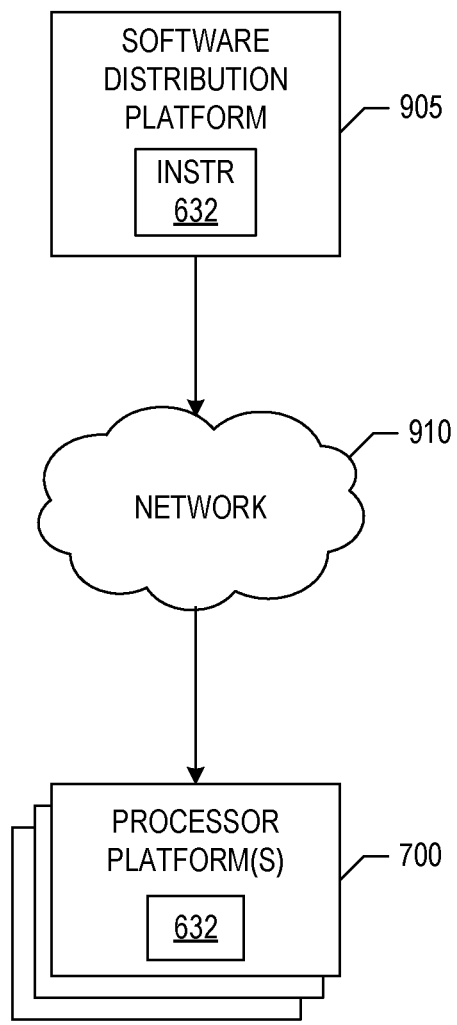
FIG. 9 is a block diagram of an example software distribution platform (e.g., one or more servers) to distribute software (e.g., software corresponding to the example machine readable instructions of FIG. 2) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 200 of FIG. 2, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 200 of FIG. 2, may be downloaded to the example processor platform 700, which is to execute the machine readable instructions 632 to implement the example environment 100. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that disable select processes for malware prevention. Disclosed systems, methods, apparatus, and articles of manufacture improve the efficiency of using a computing device by improving ability of a processor to identify a new or rarely used computer process being used on a computing device and identify a suspicious computer process, especially a non-malware binary being used maliciously. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to disable select processes for malware prevention are disclosed herein. Further examples and combinations thereof include the following:

Example 1 includes an apparatus comprising at least one memory; instructions; and at least one processor to execute the instructions to cause the at least one processor to at least: identify execution of a computer process on a computing device; determine whether the identified computer process is in a list of computer processes to be monitored; in response to the identified computer process being listed in the list of computer processes to be monitored, determine an amount of time since last execution of the identified computer process; and suspend, in response to the amount of time since last execution meeting or exceeding a threshold time, execution of the identified computer process.

Example 2 includes the apparatus of example 1, wherein the at least one processor is to determine if an override is allowed to enable execution of the identified computer process.

Example 3 includes the apparatus of example 2, wherein the at least one processor is to cause display of a notification of potential vulnerability on the computing device in response to the override being allowed.

Example 4 includes the apparatus of example 1, wherein the at least one processor is to enable the identified computer process in response to an instruction being received by the at least one processor to override a notification of potential vulnerability.

Example 5 includes the apparatus of example 1, wherein the identified computer process is a non-malware binary.

Example 6 includes the apparatus of example 1, wherein the identified computer process is a first computer process, and a second computer process on the computing device is identified in the list of computer processes to be monitored.

Example 7 includes the apparatus of example 6, wherein the at least one processor identifies a time of last usage of the second identified computer process not greater than the threshold time.

Example 8 includes the apparatus of example 7, wherein the at least one processor is to update a time since last execution of the second identified computer process on the computing device in response to allowing the second computer process on the computing device.

Example 9 includes a non-transitory computer readable medium comprising instructions which, when executed, cause a processor to at least: identify execution of a computer process on a computing device; determine whether the identified computer process is in a list of computer processes to be monitored; in response to the identified computer process being listed in the list of computer processes to be monitored, determine an amount of time since last execution of the identified computer process; and suspend, in response to the amount of time since last execution meeting or exceeding a threshold time, execution of the identified computer process.

Example 10 includes the non-transitory computer readable medium of example 9, wherein the processor is to execute the instructions to determine if an override is allowed to enable the identified computer process.

Example 11 includes the non-transitory computer readable medium of example 10, wherein the processor is to execute the instructions to cause display of a notification of potential vulnerability on the computing device in response to the override being allowed.

Example 12 includes the non-transitory computer readable medium of example 9, wherein the processor is to execute the instructions to enable the identified computer process in response to an instruction being received by the processor to override a notification of potential vulnerability.

Example 13 includes the non-transitory computer readable medium of example 9, wherein the identified computer process is a non-malware binary.

Example 14 includes the non-transitory computer readable medium of example 9, wherein the identified computer process is a first computer process, and a second computer process on the computing device is identified in the list of computer processes to be monitored.

Example 15 includes the non-transitory computer readable medium of example 14, wherein the processor is to execute the instructions to identify a time of last usage of the second identified computer process not greater than the threshold time.

Example 16 includes the non-transitory computer readable medium of example 15, wherein the processor is to execute the instructions to update a time since last execution of the second identified computer process on the computing device in response to allowing the second computer process on the computing device.

Example 17 includes a method comprising: identifying execution of a computer process on a computing device; determining whether the identified computer process is in a list of computer processes to be monitored; in response to the identified computer process being listed in the list of computer processes to be monitored, determining an amount of time since last execution of the identified computer process; and suspending, in response to the amount of time since last execution meeting or exceeding a threshold time, execution of the identified computer process.

Example 18 includes the method of example 17, including determining if an override is allowed to enable the identified computer process.

Example 19 includes the method of example 18, including causing display of a notification of potential vulnerability on the computing device in response to the override being allowed.

Example 20 includes the method of example 17, including enabling the identified computer process in response to an instruction being received by the processor to override a notification of potential vulnerability.

Example 21 includes the method of example 17, wherein the identified computer process is a non-malware binary.

Example 22 includes the method of example 17, wherein the identified computer process is a first computer process, and a second computer process on the computing device is identified in the list of computer processes to be monitored.

Example 23 includes the method of example 22, including identifying the time since last execution of the second identified computer process not greater than the threshold time.

Example 24 includes the method of example 23, including updating a time since last execution of the second identified computer process on the computing device in response to allowing the second computer process on the computing device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   instructions; and
   at least one processor to execute the instructions to cause the at least one processor to at least:
   identify execution of a computer process on a computing device, the identified computer process including a non-malware binary, wherein the execution of the identified computer process includes execution of an executable file and performance of one or more operations by the computing device, the one or more operations based on the executable file;
   determine, using a file path that describes where the executable file is stored on the computing device, whether the identified computer process is in a list of computer processes to be monitored;
   in response to the identified computer process being listed in the list of computer processes to be monitored, determine an amount of time since last execution of the identified computer process; and
   suspend, in response to the amount of time since last execution meeting or exceeding a threshold time, execution of the identified computer process by halting the performance of the one or more operations such that the execution of the process may resume later.

2. The apparatus of claim 1, wherein the at least one processor is to determine if an override is allowed to enable execution of the identified computer process.

3. The apparatus of claim 2, wherein the at least one processor is to cause display of a notification of potential vulnerability on the computing device in response to the override being allowed.

4. The apparatus of claim 1, wherein the at least one processor is to enable the identified computer process in response to an instruction being received by the at least one processor to override a notification of potential vulnerability.

5. The apparatus of claim 1, wherein the identified computer process is a first computer process, and a second computer process on the computing device is identified in the list of computer processes to be monitored.

6. The apparatus of claim 5, wherein the at least one processor is to identify a time of last usage of the second identified computer process not greater than the threshold time.

7. The apparatus of claim 6, wherein the at least one processor is to update the time since last execution of the second identified computer process on the computing device in response to allowing the second computer process on the computing device.

8. A non-transitory computer readable medium comprising instructions which, when executed, cause a processor to at least:
   identify execution of a computer process on a computing device, the identified computer process including a non-malware binary, wherein the execution of the identified computer process includes execution of an executable file and performance of one or more operations by the computing device, the one or more operations based on the executable file;
   determine, using a file path that describes where the executable file is stored on the computing device, whether the identified computer process is in a list of computer processes to be monitored;
   in response to the identified computer process being listed in the list of computer processes to be monitored, determine an amount of time since last execution of the identified computer process; and suspend, in response to the amount of time since last execution meeting or exceeding a threshold time, execution of the identified computer process by halting the performance of the one or more operations such that the execution of the process may resume later.

9. The non-transitory computer readable medium of claim 8, wherein the processor is to execute the instructions to determine if an override is allowed to enable the identified computer process.

10. The non-transitory computer readable medium of claim 9, wherein the processor is to execute the instructions to cause display of a notification of potential vulnerability on the computing device in response to the override being allowed.

11. The non-transitory computer readable medium of claim 8, wherein the processor is to execute the instructions to enable the identified computer process in response to an instruction being received by the processor to override a notification of potential vulnerability.

12. The non-transitory computer readable medium of claim 8, wherein the identified computer process is a first computer process, and a second computer process on the computing device is identified in the list of computer processes to be monitored.

13. The non-transitory computer readable medium of claim 12, wherein the processor is to execute the instructions to identify a time of last usage of the second identified computer process not greater than the threshold time.

14. The non-transitory computer readable medium of claim 13, wherein the processor is to execute the instructions to update the time since last execution of the second identified computer process on the computing device in response to allowing the second computer process on the computing device.

15. A method comprising:
identifying execution of a computer process on a computing device, the identified computer process including a non-malware binary, wherein the execution of the identified computer process includes execution of an executable file and performance of one or more operations by the computing device, the one or more operations based on the executable file;

determining, using a file path that describes where the executable file is stored on the computing device, whether the identified computer process is in a list of computer processes to be monitored;

in response to the identified computer process being listed in the list of computer processes to be monitored, determining an amount of time since last execution of the identified computer process; and suspending, in response to the amount of time since last execution meeting or exceeding a threshold time, execution of the identified computer process by halting the performance of the one or more operations such that the execution of the process may resume later.

16. The method of claim 15, including determining if an override is allowed to enable the identified computer process.

17. The method of claim 16, including causing display of a notification of potential vulnerability on the computing device in response to the override being allowed.

18. The method of claim 15, including enabling the identified computer process in response to an instruction being received to override a notification of potential vulnerability.

19. The method of claim 15, wherein the identified computer process is a first computer process, and a second computer process on the computing device is identified in the list of computer processes to be monitored.

20. The method of claim 19, including identifying a time of usage of the second identified computer process not greater than the threshold time.

\* \* \* \* \*